United States Patent
Amari et al.

(10) Patent No.: US 7,248,252 B2
(45) Date of Patent: Jul. 24, 2007

(54) VEHICULAR DIALOGUE INTERFACE WITH CENTRALIZED COMMANDER

(75) Inventors: Takeyuki Amari, Isehara (JP); Tomohiro Irinatsu, Ebina (JP); Nobuyuki Araki, Kawasaki (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 513 days.

(21) Appl. No.: 10/753,379

(22) Filed: Jan. 9, 2004

(65) Prior Publication Data

US 2004/0141007 A1 Jul. 22, 2004

(30) Foreign Application Priority Data

Jan. 17, 2003 (JP) .................. P2003-009953

(51) Int. Cl.
*G09G 5/00* (2006.01)
(52) U.S. Cl. .................. 345/184; 345/160; 345/161
(58) Field of Classification Search ............. 345/184, 345/161, 160
See application file for complete search history.

(56) References Cited

U.S. PATENT DOCUMENTS

| | | | |
|---|---|---|---|
| 5,883,346 A | 3/1999 | Stocken | |
| 6,411,934 B1 | 6/2002 | Moller et al. | |
| 6,636,197 B1 * | 10/2003 | Goldenberg et al. | 345/156 |
| 7,019,731 B2 * | 3/2006 | Nishiyama | 345/156 |

FOREIGN PATENT DOCUMENTS

| | | |
|---|---|---|
| DE | 100 56 307 A1 | 5/2002 |
| EP | 0 940 295 A1 | 9/1999 |
| EP | 1 016 556 A1 | 7/2000 |
| EP | 1 122 633 A2 | 8/2001 |
| ES | 2 165 207 | 3/2002 |
| JP | 2-187814 A | 7/1990 |
| JP | 7-41928 | 7/1995 |
| JP | 7-201256 A | 8/1995 |
| JP | 10-106404 | 4/1998 |
| JP | 10-112236 A | 4/1998 |
| JP | 10-144182 A | 5/1998 |
| JP | 10-340152 A | 12/1998 |
| JP | 11-151996 A | 6/1999 |
| JP | 2000-206583 A | 7/2000 |
| JP | 2001-143557 A | 5/2001 |
| JP | P2001-294101 A | 10/2001 |
| JP | 2002-343193 A | 11/2002 |
| JP | 2003-15809 A | 1/2003 |
| JP | 2003-68162 | 3/2003 |
| JP | 2003-308760 | 10/2003 |
| KR | 2002-0059497 | 7/2002 |
| WO | WO 02/40307 A1 | 5/2002 |

OTHER PUBLICATIONS

Japanese Office Action issued in corresponding Japanese Patent Application No. 2003-009953 dated on Feb. 27, 2007.

* cited by examiner

*Primary Examiner*—Amr A. Awad
*Assistant Examiner*—Tom V. Sheng
(74) *Attorney, Agent, or Firm*—McDermott Will & Emery LLP

(57) ABSTRACT

A display (3) displays a menu, and a centralized commander (5) has a central decision switch (6), a first scan switch (7) surrounding the decision switch and operable for an inching scan on the menu in a vertical direction, and a second scan switch (9) surrounding the first scan switch and operable for a traverse scan on the menu in a horizontal direction.

3 Claims, 6 Drawing Sheets

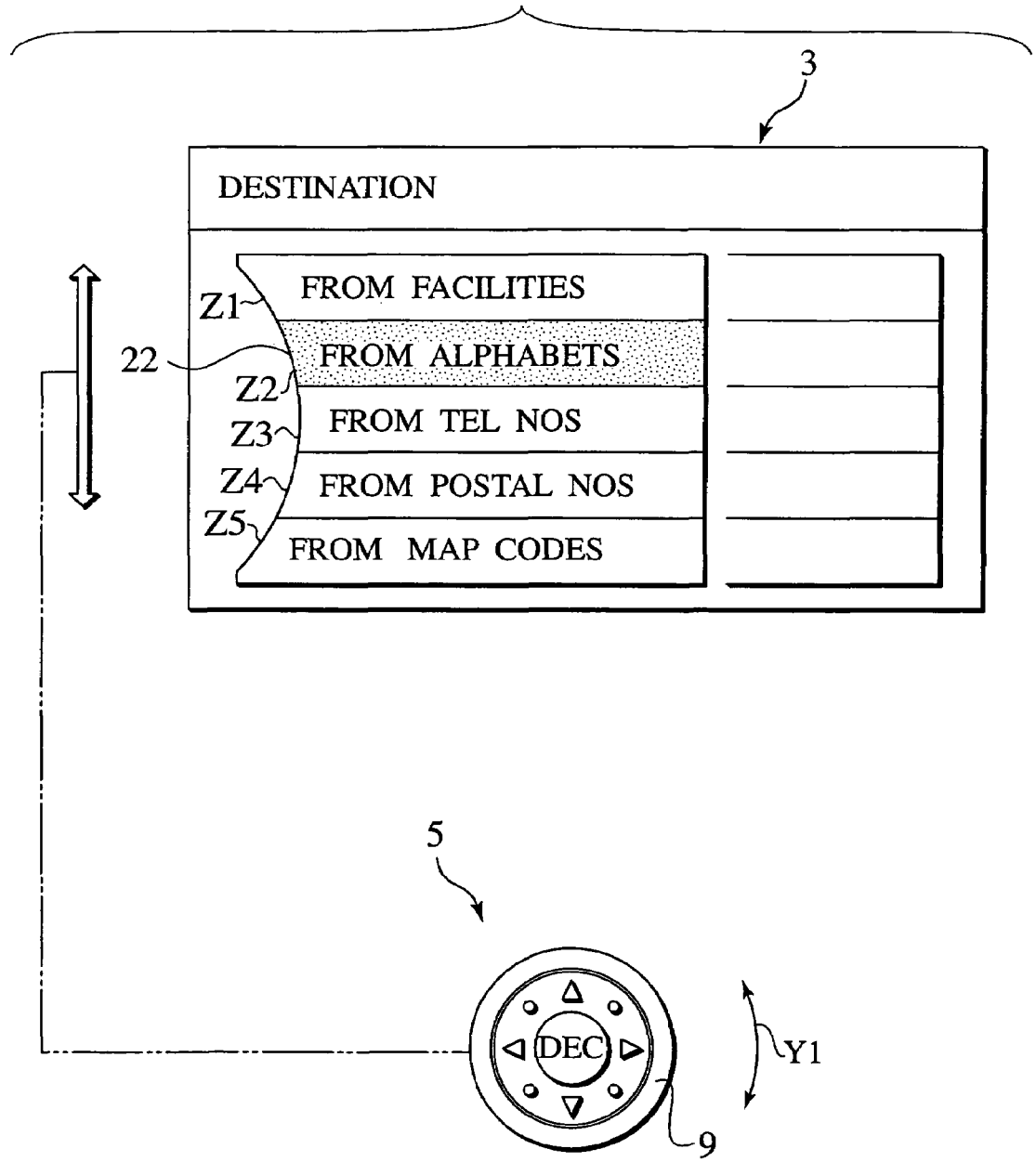

VEHICULAR DIALOGUE INTERFACE WITH CENTRALIZED COMMANDER

BACKGROUND OF THE INVENTION

1. Field of the Invention

The present invention relates to a vehicular interface between a vehicle driver or passenger and vehicle equipment, and in particular, to a vehicular interface allowing a dialogue therebetween.

2. Description of Relevant Art

Recent vehicles have various electric or electronic auxiliary equipment including, for example, a navigation system, an air conditioner, an audio or video system, and electrical appliances. They are provided with controls and elements for their operations, which are collected to a single operational module or equipment that serves as an interface between a vehicle driver or passenger and vehicle-mounted equipment.

Japanese Patent Application Laying-Open Publication No. 2001-294101 (hereafter referred to "Ref-1") has disclosed a vehicular interface of a dialogue concept including a display for visualized presentation of an operation menu, and a "centralized (i.e. single-localized and operation-commonized) combination of manually operable switching elements or controls" (hereafter called "centralized commander") as a common member having a central switch region for decision, and a peripheral switch region for directional inching scans in the operation menu.

SUMMARY OF THE INVENTION

In the Ref-1, the centralized commander may undergo an erroneous touch on the central region during a traverse scan to be effected by repetition of inching scan(s) using the peripheral region.

The present invention has been made with this point in view. It is an object of the invention to provide a vehicular dialogue interface with a centralized commander having a reduced tendency to suffer from erroneous touch.

To achieve the object, according to an aspect of the invention, there is provided a vehicular dialogue interface comprising a display, and a centralized commander comprising a first switch operable for an inching scan on the display in a first direction, and a second switch operable for a traverse scan on the display in a second direction different from the first direction.

BRIEF DESCRIPTION OF THE DRAWINGS

The above and further objects and novel features of the present invention will more fully appear from the following detailed description when the same is read in conjunction with the accompanying drawings, in which:

FIG. 4 is an illustration of an LCD (liquid crystal display) on the display panel and the commander operated for a command to make a traverse scan in a menu on the LCD;

DETAILED DESCRIPTION OF THE PREFERRED EMBODIMENTS

There will be detailed below a preferred embodiment of the present invention with reference to the accompanying drawings.

Figure 1:
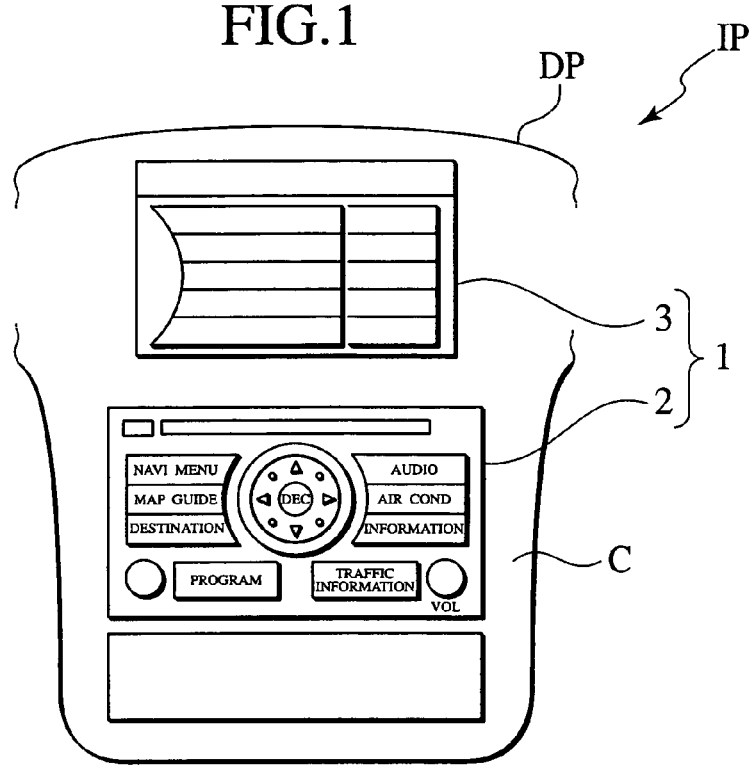
FIG. 1 is a front view of a vehicular dialogue interface panel provided with a display panel and a cluster lid according to an embodiment of the invention.
Figure 2:
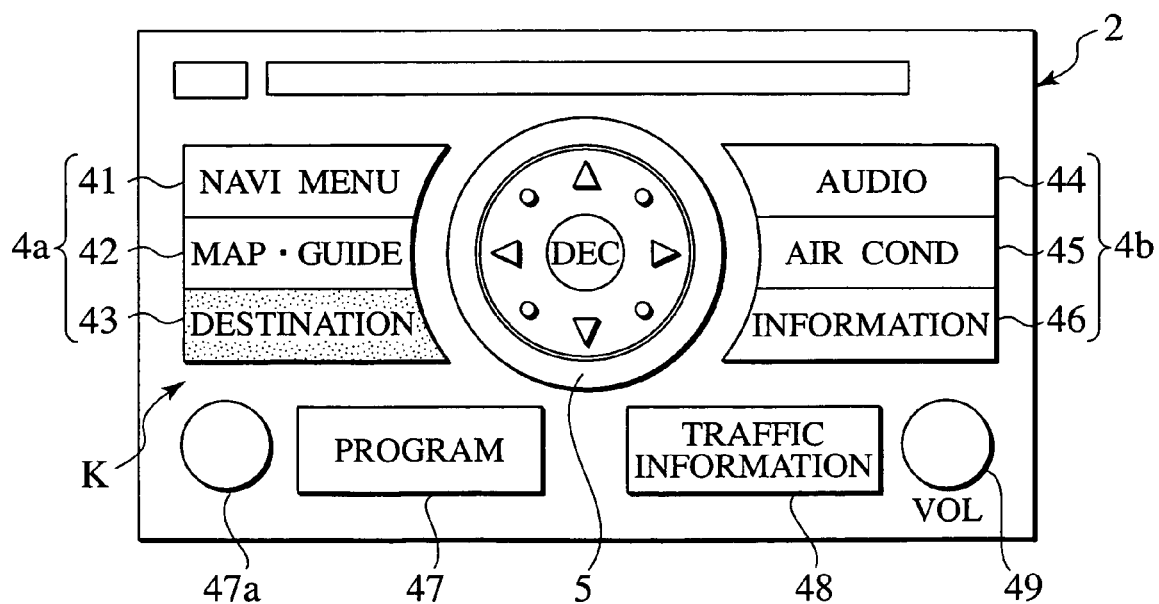
FIG. 2 is a front view of an interface module on the cluster lid.

FIG. 1 shows a vehicular dialogue interface panel IP provided with a display panel DP and a cluster lid C according to an embodiment of the invention; and FIG. 2, an interface module 2 on the cluster lid C.

The dialogue interface panel IP is configured as an interface between a vehicle driver or passenger and a vehicle-mounted computer, and includes the display panel DP and the cluster lid C, as peripheral components of the computer. In terms of vehicular operation system, the interface panel IP serves as part of a vehicular input apparatus 1 adapted for manual input operations, that is constituted by a vehicular operating apparatus configured as the interface module 2 on the cluster lid C, and a dialogue display element configured as an LCD 3 on the display panel DP.

The LCD 3 is adapted to display various programmed or manually selected operational information, e.g. title and sub-item menu of an operational item selected by the interface module 2. Any desired item in the sub-item menu on the LCD 3 cal also be selected by the module 2.

The interface module 2 is adapted for a centralized or collected operation of vehicular auxiliary equipment, and has a centralized commander 5 installed at the center of module 2. The commander 5 is configured to be actuated by a sequence of rotational, eight-directional, and/or pressing single-hand operations by a vehicle driver or passenger to provide a manual command for a traverse and/or inching scan of key or menu items, and/or decision with respect to key operation or menu item selection, as necessary for operation of concerned equipment.

The module 2 further has a set of LED-illuminated or touch-panel-superposed operational keys K wholly arranged around the commander 5, and each respectively adapted as a control or switching element to be operated or selected by a direct (e.g. finger touch or press) command thereto or indirect command via the commander 5. More specifically, the module 2 has: (as the keys K) at the left of commander 5, a left key group 4a including a navigation menu key 41, a map and guide key 42, and a destination key 43; at the right of commander 5, a right key group 4b including an audio key 44, an air conditioner key 45, and an information key 46; and under the commander 5, a program key 47 provided with an indicator 47a, and a traffic information key 48. Also a volume control 49 is provided on the module 2. Any key 41-46 in the left and right key groups 4a, 4b can be operated or selected by a corresponding command from the commander 5. For example, in FIG. 2, the destination key 43 is selected and highlighted, by pressing this key 43 directly, or by pushing a left lower diagonal part of the commander 5.

Figure 3A:
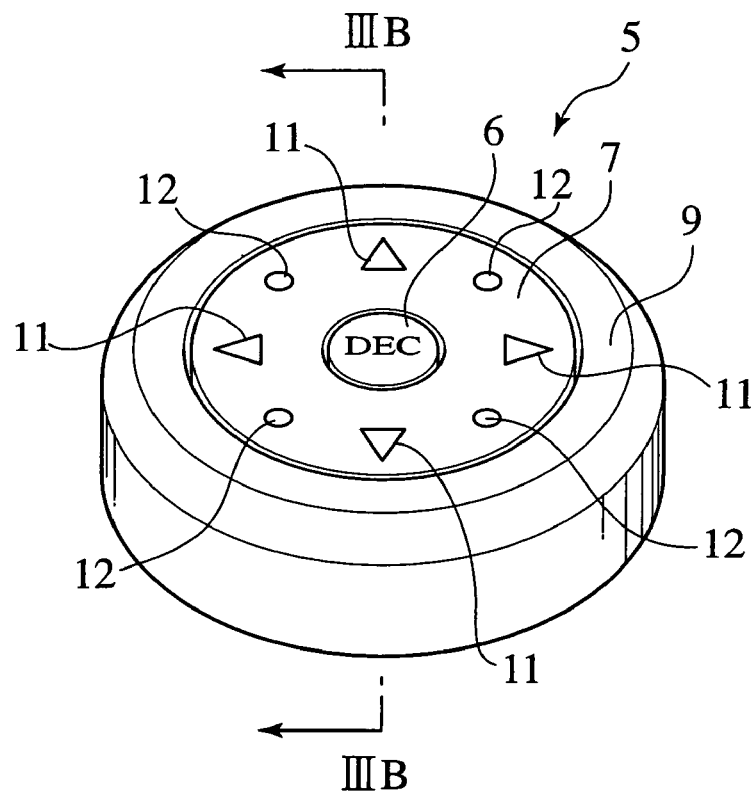
FIG. 3A is a perspective view of a centralized commander of the interface module.
Figure 3B:
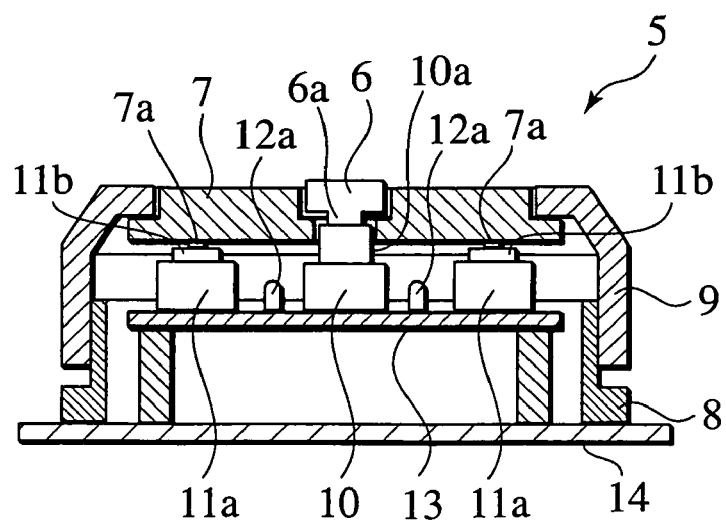
FIG. 3B is a section along line IIIB-IIIB of FIG. 3A.

FIG. 3A is a perspective view of the centralized commander 5, and FIG. 3B, a section along line IIIB-IIIB of FIG. 3A.

The centralized commander 5 is configured with: a central, circular, independent knob or push-button type switch for decision use (hereafter called "decision switch") 6; an annular, LED-illuminated eight-directional, inching-scan-oriented, continuously operable, independent flat-knob or disc-tilting switch (hereafter called "first scan switch") 7 surrounding the decision switch 6; a peripheral or circumferential, rotation angle encoding, traverse-scan-oriented, inching scan applicable, independent dial switch (hereafter called "second scan switch") 9 surrounding the first scan switch 7, together with a rotary encoder member 8 therefor, and a common base structure 14 supporting the encoder member 8, and a circuit-printed/incorporated common substrate 13 of the decision switch 6 and first scan switch 7.

The decision switch 6 is configured to be pressed down to make its diameter-reduced lower end 6a push a contact 10a of a tact switch 10 on the substrate 13. The first scan switch 7 is configured to be pressed down at an arbitrary one of eight sector regions about triangular or circular indicators 11 or 12 thereon, to make a corresponding downward projection 7a thereof push a contact (e.g. 11b) of a mating one (e.g. 11a) of eight tact switches on the substrate 13, while the number of tact switches may be four. With a pushed contact, the tact switch turns on, illuminating or lighting the indicator 11 or 12 of a corresponding sector region by an associated LED (e.g. 12a). The second scan switch 9 is configured to be rotated at a desired angle, so that this angle is detected or encoded via the encoder member 8, to effect a corresponding traverse scan.

FIG. 4 shows a vertical traverse scan (bold arrows) effected in a frame of destination menu on the LCD 3, by a corresponding CW (clockwise) and/or CCW (counterclockwise) rotation Y1 of the second scan switch 9 at the centralized commander 5.

In FIG. 4, a second menu item "FROM ALPHABETS" Z2 is selected and highlighted after a downward inching scan (from $1^{st}$ item Z1) or an upward inching scan (from $3^{rd}$ item Z3) or traverse scan (from $4^{th}$ or $5^{th}$ item Z4 or Z5). It is noted that the destination menu has an indication part 22 as a GUI (graphical user interface) element defined by lefts ends of menu items Z1 to Z5, so that the indication part 22 is arcuate in conformity with an arcuate right side of the second scan switch 9, allowing a facilitated high-speed scan. The GUI element may be defined as a configuration, direction or sense, or other geographical feature that interconnects the scan and switch.

Figure 5A:
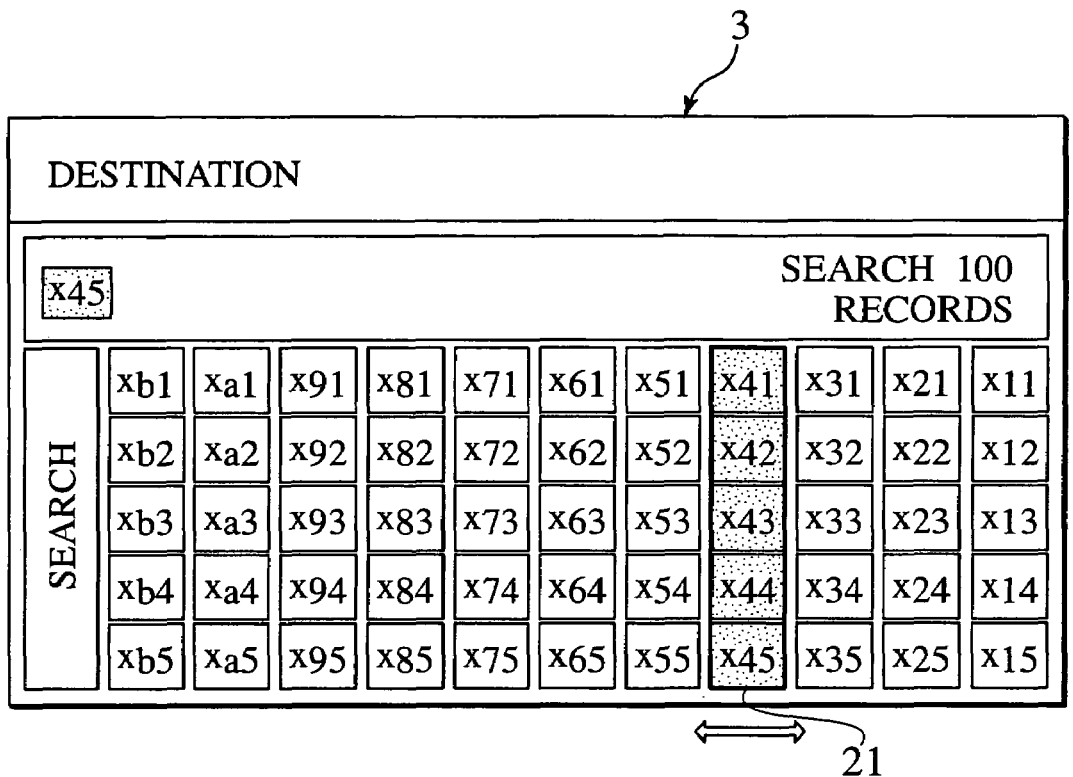
FIG. 5A is an illustration of the LCD with a code matrix adapted for traverse and inching scans to determine an intersect of column and row defining a letter of a destination to be searched.
Figure 5B:
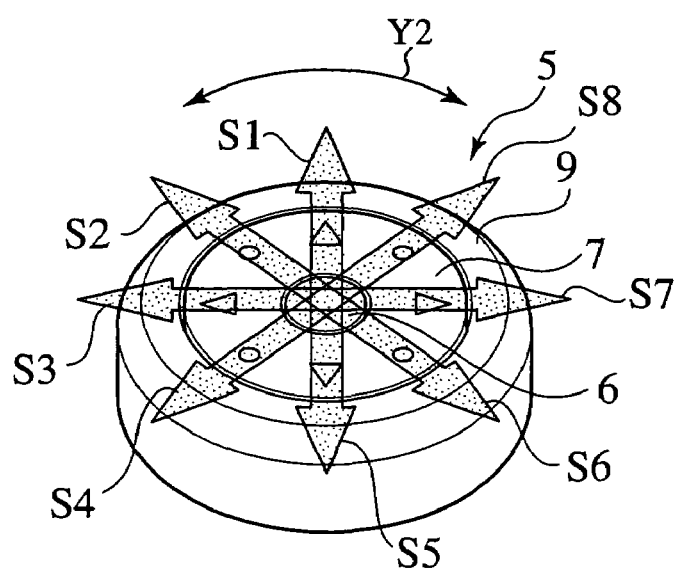
FIG. 5B is an illustration of eight directional inching commands selective by the commander.

FIG. 5A shows a frame of code matrix displayed on the LCD 3, as a 5-row 11-column matrix $\{X_{nm}: n=1, 2, 3, 4, 5, 6, 7, 8, 9, a, b; m=1, 2, 3, 4, 5\}$ of letters including alphabets, marks, and legends to be controlled under the second menu item Z2 of destination menu. FIG. 5B shows eight directional inching commands S1 to S8 each respectively selective by a directional operation to a corresponding sector region on the first scan switch 7 of commander 5.

In FIG. 5A, a selected column 21, fourth column $\{X_{41}, X_{42}, X_{43}, X_{44}, X_{45}\}$ in this case, is highlighted after a horizontal traverse scan (bold arrows) by a corresponding rotation Y2 of the second scan switch 7, to be fixed by pressing the decision switch 6. Then, a corresponding element $X_{45}$ of a fifth row $\{X_{15}, \ldots, X_{b5}\}$ is selected by repetition of or one-time application of a downward inching scan following a corresponding inching command S5, to be fixed and indicated (as $X_{45}$) at a header of the matrix frame by pressing the decision switch 6.

FIGS. 6A, 6B and 7A, 7B sequentially illustrate a correction procedure of an erroneous selection on the code matrix displayed on the LCD 3.

Figures 6A, 6B:
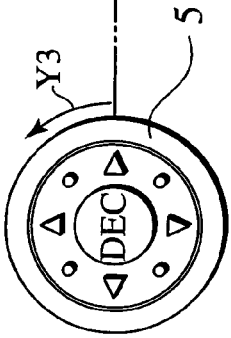
FIG. 6A is an illustration of the LCD with the code matrix erroneously scanned in the determination of destination.
FIG. 6B is an illustration of the LCD with the code matrix under a traverse scan for column correction.

In FIG. 6A, in a selected first column $\{X_{11}, X_{12}, X_{13}, X_{14}, X_{15}\}$ 21, a third-row element $X_{13}$ is selected and fixed as an erroneous last letter of a word $\{X_{45}, X_{13}, X_{22}, X_{b5}, X_{85}, X_{24}\}$ to be searched from 100 records of destination.

In FIG. 6B, after a leftward inching scan (bold arrow) by a corresponding rotation Y3 of the second scan switch of commander 5, a selected second column $\{X_{21}, X_{22}, X_{23}, X_{24}, X_{25}\}$ 21 has a third-row element $X_{23}$ thereof selected and highlighted, to be indicated at the header of code frame.

Figures 7A, 7B:
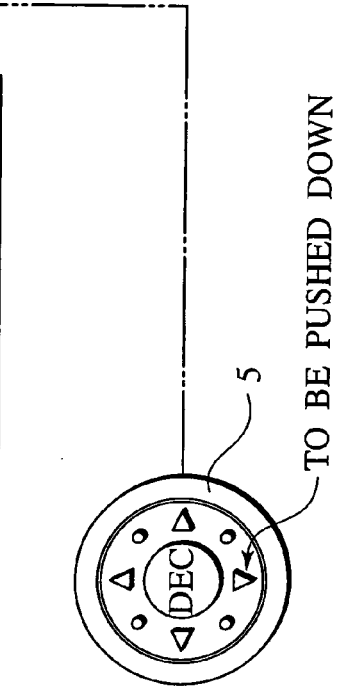
FIG. 7A is an illustration of the LCD with the code matrix scanned for selection of a correct column.
FIG. 7B is an illustration of the LCD with the code matrix under an inching scan for row correction.

In FIG. 7B, the selected element $X_{23}$ is once fixed by pressing the decision switch 6.

Then, as in FIG. 7B, a downward inching scan (bold arrow) is effected by pushing down a corresponding sector region on the first scan switch of commander 5, to select a fourth-row element $X_{24}$ of the second column, which element is highlighted and indicated at the header of code frame, to be fixed as a correct last letter of the word to be searched.

It is noted that the first and second scan switches 7, 9 are operable for scans in different or crossing directions, e.g. column and row directions, with a reduced frequency of erroneous operations, allowing an ensured facile and fast selection. The decision switch 6 and scan switches 7, 9 are independently operable relative to each other. Unintentional operation of switch 6 is thus possibly avoided irrespective of pressing position or angle of switch 7. Traverse or diagonal inching scan by switch 7 and/or 9 allows an efficient selection with less actions or eye movements of driver or passenger, leading to an improved operation and less disturbance. Switches 7 or 9 may be exclusive for scans in column or row direction, respectively, or vice versa.

The contents of Japanese Patent Application 2003-009953 are incorporated herein by reference.

While an embodiment of the invention has been described using specific terms, such description is for illustrative purposes, and it is to be understood that changes and variations may be made without departing from the spirit or scope of the following claims.

What is claimed is:

1. A vehicular dialogue interface comprising:
    a display for displaying letters; and
    a centralized commander comprising
    a decision switch installed at the center of the commander and actuated by pressing operation to output predetermined operation command;
    a first scan switch actuated by independent pressing operation relative to pressing operation of the decision switch to output directional operation command corresponding to pressing position, and operable for an inching scan of the letters in a first direction;
    a second scan switch surrounding the first scan switch and actuated by rotating operation to output signal corresponding to rotation angle, and operable for a traverse scan of the letters in a second direction different from the first direction;
    a first tact switch installed under the decision switch and detecting pressing operation of the decision switch; and
    a second tact switch installed under the first scan switch and detecting pressing operation of the first scan switch;
    wherein the first scan switch is disc-shaped and surrounds the decision switch.

2. A vehicular dialogue interface according to claim 1, wherein at least two first scan switches are provided at the top and bottom of the decision switch.

3. A vehicular dialogue interface according to claim 1, wherein the letters include letters of the alphabet.

* * * * *